Dec. 22, 1936.　　　C. C. FARMER ET AL　　　2,065,215
SLACK ADJUSTER
Filed March 23, 1935　　　2 Sheets-Sheet 1
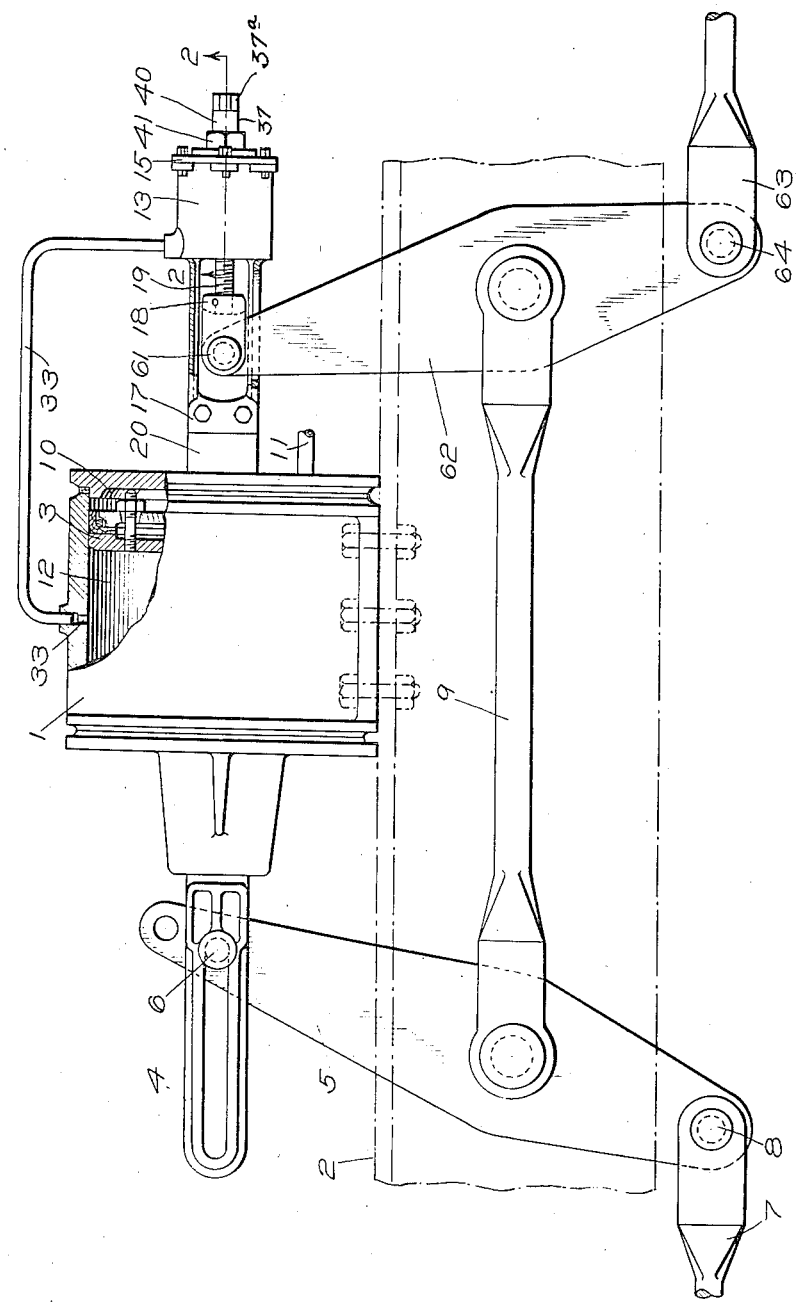
INVENTORS
CLYDE C. FARMER
JOHN E. REDFORD
BY Wm. M. Cady
ATTORNEY Dec. 22, 1936.  C. C. FARMER ET AL  2,065,215
SLACK ADJUSTER
Filed March 23, 1935  2 Sheets-Sheet 2
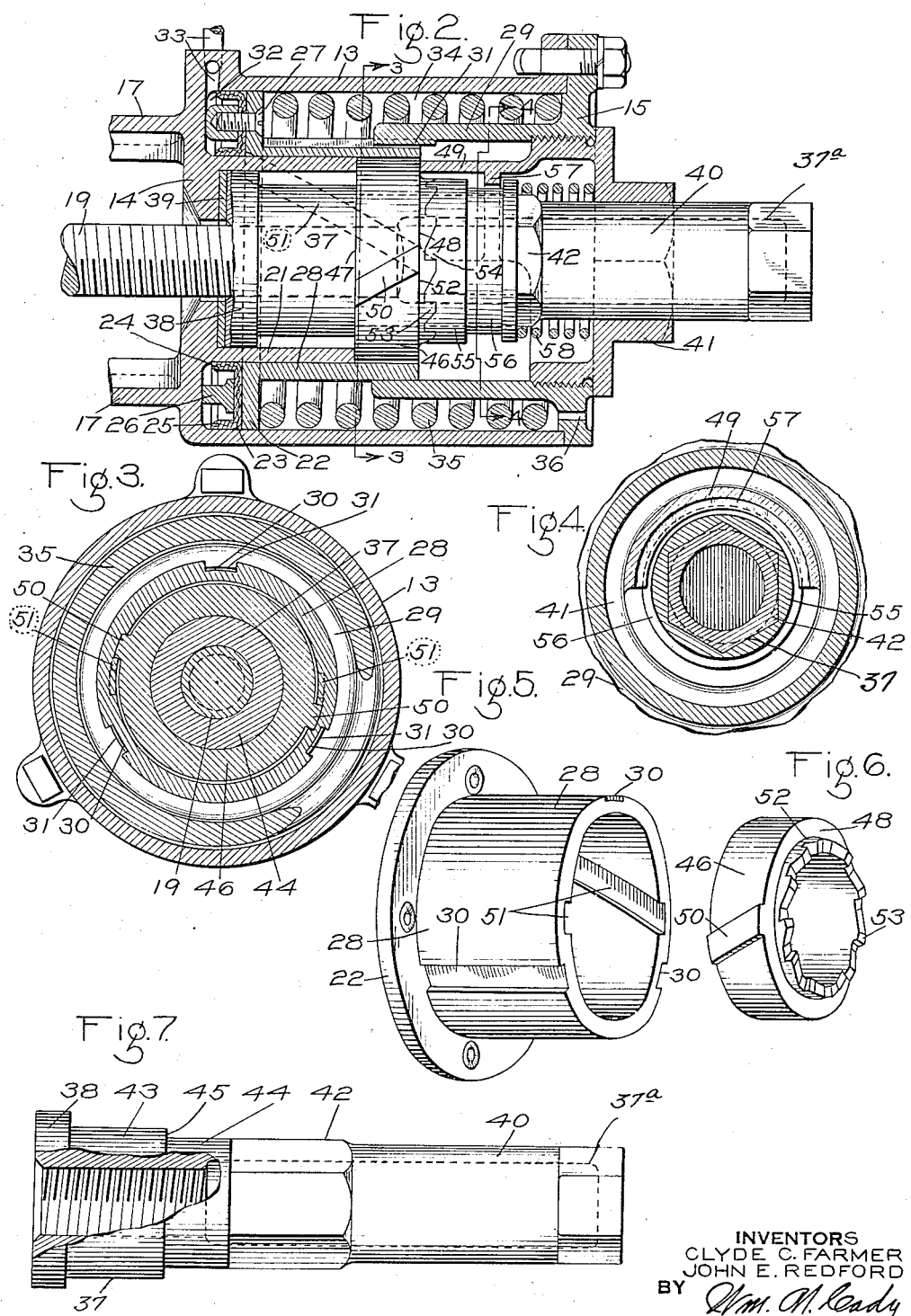
INVENTORS
CLYDE C. FARMER
JOHN E. REDFORD
BY Wm. N. Cady
ATTORNEY Patented Dec. 22, 1936

2,065,215

UNITED STATES PATENT OFFICE 2,065,215

SLACK ADJUSTER

Clyde C. Farmer, Pittsburgh, Pa., and John E. Redford, Florissant, Mo., assignors to The Westinghouse Air Brake Company, Wilmerding, Pa., a corporation of Pennsylvania Application March 23, 1935, Serial No. 12,560

23 Claims. (Cl. 188—203)

This invention relates to slack adjusters adapted to automatically take up slack in railway brake riggings caused by wear of the brake shoes and other parts and relates more particularly to a slack adjuster of the type which is supplied with fluid under pressure when the brake cylinder piston has moved out a predetermined distance in applying the brakes and which, when the fluid under pressure is released therefrom in releasing the brakes, will operate to take up slack.

Heretofore slack adjusters of the above mentioned type have each been provided with a slack take-up mechanism and a fluid pressure controlled motor or cylinder mechanism for effecting the operation of the slack take-up mechanism, which cylinder mechanism is disposed at one side of and at right angles to the slack take-up mechanism. The cylinder mechanism is of considerable length and due to this considerable difficulty has been experienced in mounting the slack adjuster where the available space is limited, this being especially the case where the slack adjuster is to be mounted on a car truck.

The available space on the truck for mounting these devices is necessarily very limited and it has been found exceptionally difficult to properly mount the slack adjuster, and at the same time adhere to the usual very restricted clearance limitations about the truck.

The principal object of the present invention is to provide an improved slack adjuster of the above mentioned type which is so constructed and arranged as to alleviate the aforementioned difficulties.

Other objects and advantages will appear in the following more detailed description of the invention.

In the accompanying drawings, Fig. 1 is a plan view, partly in section, of a portion of a brake rigging embodying the invention; Fig. 2 is a fragmentary enlarged longitudinal section view of the slack adjuster taken on the line 2—2 of Fig. 1; Fig. 3 is a cross sectional view of the slack adjuster taken on the line 3—3 of Fig. 2; Fig. 4 is a fragmentary cross sectional view taken on the line 4—4 of Fig. 2; Fig. 5 is a perspective view of the piston of the slack adjuster, the piston packing being omitted; Fig. 6 is a perspective view of a ratchet member which cooperates with the piston; and Fig. 7 is a longitudinal elevational view of the adjusting nut of the slack adjuster.

In Fig. 1 of the drawings, the improved slack adjuster is shown mounted on a brake cylinder 1 which is secured to a fixed member 2 which may constitute a part of a car body or of a truck.

The brake cylinder 1 may be of the usual construction comprising a cylinder portion containing a piston 3 adapted to actuate a push rod 4 which, in the present embodiment of the invention, is operatively connected to the one end of a brake cylinder lever 5 by means of a pin 6, the other end of the lever being operatively connected to one end of a tension rod 7 by means of a pin 8. Although not shown, the other end of the tension rod 7 may be operatively connected in any desired manner to the other parts of the brake leverage system.

At one side of the brake cylinder piston 3 is a chamber 10 which is in communication with the usual brake cylinder pipe 11 through which fluid is adapted to be supplied to the chamber to effect an application and through which fluid under pressure is adapted to be vented from the brake cylinder to effect the release of the brakes. At the other side of the piston there is a chamber 12 which is in constant communication with the atmosphere in the usual manner.

The slack adjuster comprises a casing having a take-up cylinder portion 13 which is provided with an integral wall or pressure head 14 at one end of the cylinder. The casing also comprises a combined guide and cap section 15 which is annular in form and which is bolted or otherwise rigidly secured to the cylinder section.

Extending rearwardly from the pressure head 14 and preferably integral therewith are spaced members 17 which serve as guides for a crosshead 18 secured to the outer end of a non-rotatable adjusting member or screw 19. In the present embodiment of the invention, the ends of the members 17 overlap and are secured to a lug 20 integral with and extending outwardly from the pressure head of the brake cylinder 1.

Interiorly of the cylinder portion 13 of the casing, an annular cylinder wall 21 is provided which is integrally connected at one end with the pressure head 14. This wall 21 is of less diameter and of less length than the outer wall of the cylinder portion and is concentric therewith.

Contained in the space between the outer and inner walls of the cylinder portion 13 of the casing is a piston 22, which is annular in form and which surrounds and slidably contacts with the inner wall, which piston has secured to its pressure face an annular packing 23 having an inner annular skirt 24 which slidably engages the outer surface of the inner cylinder wall 21 and also having an outer annular skirt 25 which slidably engages the inner surface of the outer cylinder wall, The packing 23 is secured to the piston by means of an annular member 26 which is secured to the piston by means of countersunk machine screws 27 which have screw-threaded connection with the member. This member, as shown in Fig. 2, is adapted to engage the inner surface of the pressure head 14 and limit the inward movement of the piston so as to prevent the skirts of the piston packing from being forced against the pressure head and thereby damaged.

The piston 22 is provided with an annular sleeve 28 which encircles and slidably engages the inner cylinder wall 21. The end of this sleeve extends beyond the end of the wall 21 and is slidably guided in an annular sleeve 29 which is preferably integral with the cap section 15 of the casing.

The piston sleeve 28 is provided exteriorly with longitudinally extending grooves 30 for the reception of lugs 31 which are provided on the interior of the annular sleeve 29. Since the guide and cap section 15 is secured to the cylinder portion 13 against rotation, the lugs 31, by reason of their cooperation with the piston sleeve, prevent the piston 22 from rotating relative to the outer and inner cylinder walls.

At one side of the piston 22 is a pressure chamber 32 which is connected through a pipe and passage 33 to the chamber 12 of the brake cylinder 1 so long as the piston is not caused to move outwardly to a point beyond the passage 33 of the brake cylinder. At the other side of the piston is a chamber 34 containing a coil spring 35 which is interposed between and operatively engages the rear face of the piston and the inner face of the combined guide and cap section 15 of the casing. This chamber 34 is connected through a passage 36 to the atmosphere.

The outer end of the adjusting member or screw 19, as hereinbefore described, has secured thereto the cross-head 18. The inner end portion of the adjusting member extends through a central opening in the rear wall 14 of the cylinder portion 13 of the casing and has screw-threaded connection with a rotatable adjusting nut 37 contained in the space defined by the inner surface of the inner cylinder wall 21.

The inner end portion of the adjusting nut 37 is provided with an enlarged circular portion 38 which has a rotatable fit with the inner surface of the inner cylinder wall 21 and the end face of such portion slidably engages a thrust bearing 39 which is interposed between the circular portion and end wall 14 of the casing. The outer end portion 40 of the adjusting nut is journalled in a nut 41 which extends into the central opening of the cap section 15 and has screw-threaded connection with the inner surface of the annular sleeve 29 of the cap section. This portion 40 of the adjusting nut extends through the nut 41 and at its extreme outer end portion is preferably made hexagonal in shape for engagement by a wrench or other suitable tool.

The adjusting nut intermediate the portions 38 and 40 is provided with a hexagonal portion 42 and circular portions 43 and 44, the circular portion 43 being of greater diameter than the portion 44 so as to form an annular shoulder 45.

Rotatably mounted on the portion 44 is an annular clutch member 46 which is encircled by the outer end of the piston sleeve 28. Within the sleeve 28 the rear face 47 of the clutch member 46 is in contact with the outer end surface of the inner cylinder wall 21. The opposite face 48 of the member 46 is in contact with the inner end surface of a semi-circular thrust bearing 49 which is preferably integral with the nut 41. The periphery of the member 46 is provided with one or more spiral male threads 50 which are operatively engaged by the piston sleeve 28 within spiral female threads 51 with which the interior surface of the piston sleeve is provided.

Integral with the clutch member 46 and extending outwardly from the face 48 thereof is a short sleeve 52 which, at its outer end is provided with clutch teeth 53 which are adapted to engage with corresponding clutch teeth 54 of a clutch member 55 mounted on the hexagonal portion 42 of the adjusting nut. It will here be understood that the central opening through the clutch member 55 is hexagonal in shape and within the opening, the clutch member engages the hexagonal portion 42 and thereby forms a driving connection between the clutch member 55 and the adjusting nut. It will also be understood that although there is a driving connection between the clutch member 55 and the adjusting nut, sufficient clearance is provided between the clutch member and hexagonal portion of the adjusting nut to permit the clutch member to slide back and forth on the hexagonal portion in directions longitudinally of the adjusting nut.

The clutch member 55, intermediate its ends is provided with an exterior groove 56 into which extends a semi-circular lug 57 which is preferably integral with the thrust bearing 49 and is arranged interiorly thereof. This lug 57 is of considerably less width than the groove 56 so as not to interfere with the sliding movement of the clutch member 55 relative to the adjusting nut under normal operating conditions and is located adjacent the right hand side wall of the groove for reasons which will hereinafter be fully described.

Interposed between and operatively engaging the right hand end of the clutch member 55 and the inner surface of the nut 41 is an initially compressed spring 58 which, at all times, tends to urge the clutch member 55 in the direction toward the clutch member 46.

The cross-head 18 has pivotally connected therewith by a pin 61 one end of a lever 62, the other end of said lever being pivotally connected to a tension rod 63 by means of a pin 64, said tension rod being operatively connected in a suitable manner to the other parts of the brake leverage system. The levers 5 and 62 are operatively connected together intermediate their ends by means of a connecting rod 9.

In operation when the brake shoes or other parts of the brake rigging become worn to such an extent that, in effecting an application of the brakes, the brake cylinder piston 3 moves outwardly a sufficient distance to uncover the passage 33 in the brake cylinder, fluid under pressure flows from the piston chamber 10 by way of pipe and passages 33 to the piston chamber 32 of the slack adjuster, causing the piston 22 and thereby the piston sleeve 28 to move outwardly in the direction toward the right hand, compressing the spring 35.

As the piston 22 and piston sleeve are thus moved, the spiral threads 51 on the sleeve, acting through the medium of the spiral male threads 51 cause the clutch member 46 to rotate in a counter-clockwise direction relative to the clutch member 56 as will be understood from Fig. 2. When the clutch member 46 is thus rotated the teeth 53 thereof slide over the teeth 54 of the clutch member 55 and in so doing move the clutch member 55 in a direction toward the right hand against the opposing pressure of the spring 58. When the brakes are applied the stresses set up in the brake rigging are transmitted to the adjusting nut 37 through the medium of the adjusting screw 19, and cause the frictional resistance of the adjusting nut to rotary movement to be increased to such an extent as to positively maintain the nut and therefore the clutch member 55 against rotation by the clutch member 46.

It will be noted that when the piston is moved outwardly, the clutch member 46 is prevented from moving longitudinally of the adjusting nut by the thrust bearing 49.

When, in releasing the brakes, fluid under pressure is vented by way of pipe 11 from the brake cylinder piston chamber 12, the brake cylinder piston 3 is caused to move to its normal release position in the usual manner, the piston in its traverse first cutting off the connection between the piston chamber 10 and the passage and pipe 33 and then uncovering the communication 33 to the brake cylinder chamber 12 which is connected to the atmosphere, so that fluid under pressure is vented from the take-up piston chamber 32 to the atmosphere.

With the piston chamber 32 thus vented, the compressed spring 35 acts to return the piston 22 and piston sleeve 28 to their normal position as shown in Fig. 2, and during their return are prevented from rotating by the engagement of the lugs 31 on the sleeve 29 of the cap section 15 of the casing with the piston sleeve. Since the piston and piston sleeve cannot rotate, the interengaging spiral threads on the piston sleeve and clutch member 46 cooperate to rotate the clutch member 46 in a clockwise direction. When the clutch member 46 is rotated in this direction, the teeth 53 thereof engage with the teeth 54 of the clutch member 55, so that the clutch member 55 and consequently the adjusting nut 37 are rotated in a clockwise direction by the clutch member 46, as will be understood from Fig. 2, causing the adjusting screw to be moved in a direction toward the right hand and thereby causing the slack in the brake rigging to be taken up.

If for any reason it should be desired to operate the slack adjuster manually to take up slack, the adjusting nut is rotated in a clockwise direction by means of a wrench or other suitable tool which may be applied to the hexagonal outer end portion 32 of the nut. It will here be noted that when the adjusting nut is thus rotated, the clutch member 55 rotates with it, and since the clutch member 46 is prevented from rotating and the clutch member 55 is free to slide longitudinally of the nut, the teeth 54 of the rotating clutch member 55 will idle or ratchet over the teeth 53 of the stationary clutch member 46. This rotation of the adjusting nut causes the adjusting screw to be moved in a direction toward the right hand and thereby causes the slack in the brake rigging to be taken up.

When worn brake shoes are replaced by new ones, it is necessary to move the cross-head 18 in a direction toward the left hand, a suitable distance, by means of the screw 19, and in order to do this, the adjusting nut must be turned manually in a counter-clockwise direction by means of a wrench or other suitable tool which may be applied to the outer hexagonal end portion of the adjusting nut. Since the piston sleeve 28 and clutch member 46 are held against rotation and the teeth 53 of this clutch member are in engagement with the teeth 54 of the clutch member 55, the adjusting nut is locked against such adjusting movement. In order to unlock the adjusting nut, the nut 41 is slacked back and, as this is done, the lug 57 thereon engages and moves the clutch member 55 in a direction toward the right hand. When the nut 41 has been slacked back a sufficient distance, the teeth 54 of the clutch member 55 will be free of the teeth 53 of the clutch member 46, thus unlocking the adjusting nut 37 to permit its free rotation. After the desired adjustment has been made the nut 41 is again screwed home as shown in Fig. 2 so that the adjusting nut is again locked against rotation in the counter-clockwise direction.

It will here be understood that although the adjusting member 19 has been described as being non-rotatable, we do not wish to be limited to this for it is obvious that the inner end of the member 19 may be secured to the portion 43 of the rotatable element 40 and that the outer end of the member may have screw-threaded connection with the cross-head 18 to provide for adjustment of the brake rigging.

From an inspection of Fig. 2 of the drawings it will be noted that upon the removal of the nut 41 from the non-pressure head 15 of the take-up cylinder, the spring 58, clutch member 55, member 46, and adjusting nut 40 may be removed and replaced by way of the open end of the casing without interfering with the piston assembly or the connection between the cylinder and its support, thus facilitating inspection or repairs and at the same time guarding the piston assembly against possible damage when the several parts of the take-up mechanism are being assembled or disassembled as the case may be.

While one illustrative embodiment of our invention has been described in detail, it is not our intention to limit its scope to this embodiment or otherwise than by the terms of the appended claims.

Having now described our invention, what we claim as new and desire to secure by Letters Patent is:

1. In a brake slack adjuster, in combination, a movable slack take-up member, an annular fluid pressure cylinder having inner and outer concentric walls, said inner wall being of less length than the outer wall, means operable to actuate said member, and an annular piston in said cylinder slidably contacting with said walls and operative to actuate said means, said piston being operatively connected with said means at the end of the inner wall of the cylinder.

2. In a brake slack adjuster, in combination, a movable slack take-up member, an annular fluid pressure cylinder having inner and outer concentric walls, said inner wall being of less length than the outer wall, means operable to actuate said member, and an annular piston in said cylinder slidably contacting with said walls and operative to actuate said means, said piston having a direct driving connection with said means at the end of the inner wall of the cylinder.

3. In a brake slack adjuster, in combination, a movable slack take-up member, an annular fluid pressure cylinder having inner and outer concentric walls, said inner wall being of less length than the outer wall, means located at the end of said inner wall operable to actuate said member, and an annular piston in said cylinder slidably contacting with said walls and operable to actuate said means.

4. In a brake slack adjuster, in combination, a movable slack take-up member, an annular fluid pressure cylinder having inner and outer concentric walls, said inner wall being of less length than the outer wall, means located at the end of said inner wall operable to actuate said member, a driving element operatively connected with said means at the end of said inner wall operative to actuate said means, and an annular piston in said cylinder slidably contacting with said walls operative to actuate said element.

5. In a brake slack adjuster, in combination, a movable slack take-up member, an annular fluid pressure cylinder having inner and outer concentric walls, said inner wall being of less length than the outer wall, means located at the end of said inner wall operable to actuate said member, a driving element operatively connected with said means at the end of said inner wall operative to actuate said means, a spring, and an annular piston in said cylinder slidably contacting with said walls and being adapted to be operated by fluid under pressure for actuating the driving element to condition said means for operation to actuate said member to take up slack and operative by said spring upon the relief of fluid pressure for actuating said element and thereby said means to move said member to take up slack.

6. In a brake slack adjuster, in combination, a movable slack take-up member, an annular fluid pressure cylinder having inner and outer concentric walls, said inner wall being of less length than the outer wall, a mechanism located at the end of said inner wall operable to actuate said member, a sleeve slidably carried by said inner wall and operatively connected with said mechanism, and an annular piston for actuating said sleeve and thereby said mechanism, said piston slidably contacting with said walls.

7. In a brake slack adjuster, in combination, a movable threaded slack take-up member, an annular fluid pressure cylinder having inner and outer concentric walls, said inner wall being of less length than the outer wall, an annular piston in said cylinder slidably contacting said walls, a rotatable nut operative to move said member to take up slack, and a clutch mechanism located at the end of said inner wall operative by said piston for actuating said nut, said clutch mechanism comprising a rotatable clutch member adapted to be driven by said piston and comprising another clutch member cooperating with the first mentioned clutch member and nut for transmitting rotary movement from the first mentioned clutch member to said nut.

8. In a brake slack adjuster, in combination, a movable threaded slack take-up member, an annular fluid pressure cylinder having inner and outer concentric walls, said inner wall being of less length than the outer wall, an annular piston in said cylinder contacting said walls, a rotatable nut operative to move said member to take up slack, and a clutch mechanism located at the end of said inner wall operative by said piston for actuating said nut, said clutch mechanism comprising a clutch member rotatably mounted on said nut and adapted to be driven by said piston and comprising another rotatable clutch member mounted on said nut and being non-rotatable relative to the nut adapted to be driven by the first mentioned clutch member for transmitting rotary motion to said nut.

9. In a brake slack adjuster, in combination, a movable slack adjusting member, a fluid pressure controlled motor, a member operative to move said slack adjusting member, mechanism comprising two interengaging rotatable clutch members operative by said motor for actuating said member to take up slack and for locking said member against unwanted operation to increase the slack, and means operative manually to move one of said clutch members out of engagement with the other clutch member to unlock said mechanism.

10. In a brake slack adjuster, in combination, a slack adjusting element movable in one direction for taking up slack and movable in the opposite direction to increase the slack, a member operative to actuate said element, a fluid pressure controlled motor, two interengaging rotatable clutch members adapted to be rotated by said motor to actuate said member and thereby said element to take up slack, said clutch members cooperating with each other and with the motor to lock said element against unwanted movement in the direction to increase slack, means normally holding said clutch members in operative relationship with each other and operative to positively disengage said clutch members to unlock said element.

11. In a brake slack adjuster, in combination, a movable slack adjusting element, a fluid pressure cylinder, a piston operatively mounted in the cylinder, a non-pressure head for the cylinder, mechanism comprising two interengaging rotatable clutch members operative by said piston for actuating said element to take up slack, said mechanism cooperating with said piston to lock said element against unwanted movement in a direction to increase slack, and means carried by said non-pressure head operative to move one of said clutch members out of engagement with the other clutch member to condition said mechanism to permit said element to be moved in the direction to increase slack.

12. In a brake slack adjuster, in combination, a movable slack adjusting element, a fluid pressure cylinder, a piston operatively mounted in the cylinder, a non-pressure head for the cylinder, mechanism comprising two rotatable interengaging clutch members operative by said piston for actuating said element to take up slack, said mechanism cooperating with said piston to lock said element against unwanted movement in a direction to increase slack, and means having screw-threaded connection with the non-pressure head and operative manually to move one of said clutch members out of engagement with the other clutch member to thereby condition said mechanism to permit said element to be moved in the direction to increase slack.

13. In a brake slack adjuster, in combination, a movable slack adjusting element, a rotatable mechanism operative to actuate said element to take up slack, a fluid pressure cylinder, a piston in said cylinder, a sleeve carried by said piston having a driving connection with said mechanism and operative by said piston, a non-pressure head for said cylinder, and means carried by the non-pressure head and interlocking with said sleeve for at all times preventing rotation of said sleeve and piston.

14. In a brake slack adjuster, in combination, a movable slack adjusting element, a mechanism operative to actuate said element to take up slack, a fluid pressure cylinder having inner and outer concentric walls, an annular piston operatively mounted in said cylinder and slidably contacting with said walls, and a sleeve carried by said piston and slidably guided by said inner wall and at the end of said inner wall having a driving connection with said mechanism.

15. In a brake slack adjuster, in combination, a movable slack adjusting element, a mechanism operative to actuate said element to take up slack, a fluid pressure cylinder having inner and outer concentric walls, a piston operatively mounted in said cylinder and slidably guided by said inner wall, a sleeve carried by said piston and slidably guided by said inner wall and at the end of said inner wall having a driving connection with said mechanism, a non-pressure head for said cylinder, and a sleeve carried by the non-pressure head in telescopic relation with the piston sleeve and forming an additional guide for the piston sleeve.

16. In a brake slack adjuster, in combination, a movable slack adjusting element, a mechanism operative to actuate said element to take up slack, a fluid pressure cylinder having inner and outer concentric walls, a piston operatively mounted in said cylinder and slidably guided by said inner wall, a sleeve carried by said piston and slidably guided by said inner wall and at the end of said inner wall having a driving connection with said mechanism, a non-pressure head for said cylinder, a sleeve carried by the non-pressure head and overlapping the piston sleeve, and means carried by the sleeve of the non-pressure head cooperating with said sleeve to prevent rotation of the sleeve and thereby the piston.

17. In a brake slack adjuster, in combination, a slack take-up mechanism, a fluid pressure motor operative to actuate said mechanism and comprising an annular cylinder surrounding the mechanism, and a member carried by said cylinder for holding said mechanism in position relative to the cylinder, said member being removable from the cylinder to permit the removal of said mechanism without disturbing the motor.

18. In a brake slack adjuster, in combination, a slack take-up mechanism, a fluid pressure motor operative to actuate said mechanism and comprising an annular cylinder surrounding the mechanism, an annular non-pressure head for said cylinder through the opening of which the mechanism is adapted to be either positioned or removed, and a member removably secured to said non-pressure head for holding said mechanism positioned.

19. In a brake slack adjuster, in combination, a slack take-up mechanism, a fluid pressure motor operative to actuate said mechanism and comprising an annular cylinder surrounding the mechanism, an annular non-pressure head for said cylinder through the opening of which the mechanism is adapted to be either positioned or removed, and a member having screw-threaded connection with the non-pressure head for holding said mechanism positioned and being removable from the non-pressure head to permit the removal and replacement of the mechanism without disturbing the motor.

20. In a brake slack adjuster, in combination, a slack take-up mechanism, a fluid pressure motor operative to actuate said mechanism and comprising an annular cylinder surrounding the mechanism, and means carried by said cylinder holding said mechanism positioned with relation to the cylinder and constituting a bearing for the mechanism, said means being removable from the cylinder to permit the removal of the mechanism without disturbing the motor.

21. In a brake slack adjuster, in combination, an annular cylinder having at one end an annular pressure head and having at the other end an annular non-pressure head, a piston longitudinally movable in said cylinder, a movable slack take-up member extending through the opening in said pressure head and exteriorly of the cylinder being adapted to be operatively connected to a part to be actuated to take up slack, means surrounded by said cylinder operative by said piston to actuate said take-up member to take up slack, said means being removable through the opening in said non-pressure head, and means removably secured to said non-pressure head normally maintaining said means against removal.

22. In a brake slack adjuster, in combination, an annular cylinder having at one end an annular pressure head and having at the other end an annular non-pressure head, a piston longitudinally movable in said cylinder, a movable slack take-up member extending through the opening in said pressure head and exteriorly of the cylinder being adapted to be operatively connected to a part to be actuated to take up slack, means surrounded by said cylinder operative by said piston to actuate said take-up member to take up slack, said means being removable through the opening in said non-pressure head, and means removably secured to said non-pressure head normally forming a bearing for said means and normally maintaining said means against removal from the cylinder.

23. In a brake slack adjuster, in combination, an annular cylinder having at one end an annular pressure head and having at the other end an annular non-pressure head, a piston longitudinally movable in said cylinder, a movable slack take-up-member extending through the opening in said pressure head and exteriorly of the cylinder being adapted to be operatively connected to a part to be actuated to take up slack, means surrounded by said cylinder operative by said piston to actuate said take-up member to take up slack, said means being of less diameter than that of the opening in the non-pressure head so that the means may be removed or replaced through said opening, and means removably secured to said non-pressure head and extending through said opening for normally maintaining said means against removal from the cylinder.

CLYDE C. FARMER.
JOHN E. REDFORD.